(No Model.)

C. BECK.
WIRE SPOOL OR REEL.

No. 515,737. Patented Mar. 6, 1894.

WITNESSES:
C. C. Duffy
Hubert E. Beck.

INVENTOR
Chas. Beck
BY O. E. Duffy
ATTORNEY.

UNITED STATES PATENT OFFICE.

CHARLES BECK, OF PHILADELPHIA, PENNSYLVANIA.

WIRE SPOOL OR REEL.

SPECIFICATION forming part of Letters Patent No. 515,737, dated March 6, 1894.

Application filed October 15, 1892. Serial No. 448,970. (No model.)

*To all whom it may concern:*

Be it known that I, CHARLES BECK, of Philadelphia, in the county of Philadelphia and State of Pennsylvania, have invented certain new and useful Improvements in Spools; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in wire spools or reels.

Heretofore wire for box makers, binders, &c., has been furnished and shipped on solid wooden or iron spools which were not only very bulky, but added to the size and weight of the package in shipping, and the customer in order to have his spool refilled had to send it back to the supply house, perhaps at a long distance, thus incurring the expense of freight and cartage.

The object of this invention is to provide an improved spool which is so constructed and arranged as to readily receive a coil of wire that can be easily shipped in small size without a spool or a carrier, thereby effecting great saving to the consumer.

A further object of the invention is to provide an improved spool to receive wire exceedingly simple and durable in construction and so constructed and arranged as to prevent the coil unwinding on the spool except as desired.

The invention consists in certain novel features of construction and in combinations of parts more fully described hereinafter and particularly pointed out in the claims.

Figure 1:
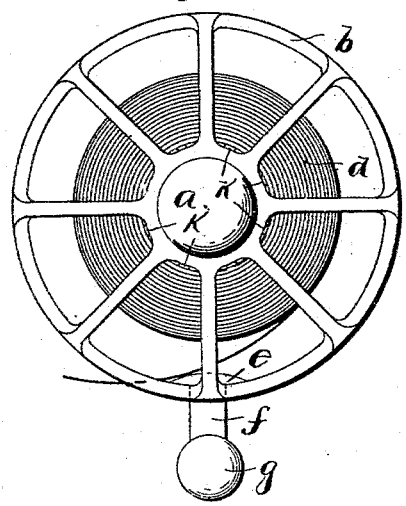
Figure 2:
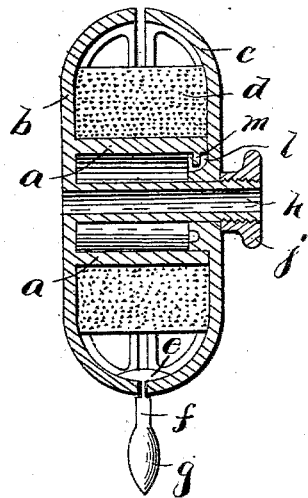
Figure 3:
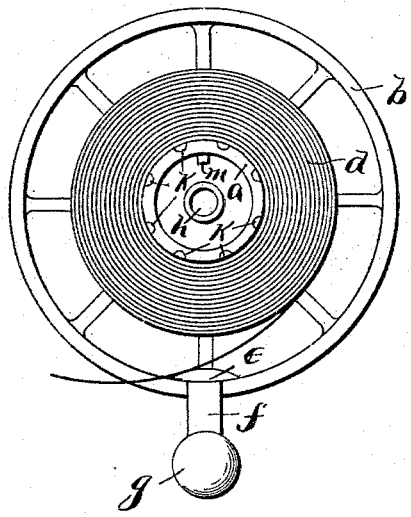
Figure 4:
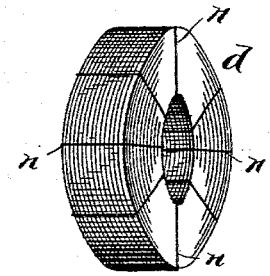

Referring to the accompanying drawings Figure 1, is a side elevation of the spool with a coil of wire thereon. Fig. 2, is a cross section thereof. Fig. 3, is a side elevation with one side of the spool removed. Fig. 4, is a detail perspective of a coil of wire as put up for shipment and use on the spool.

The spool is composed of a hub $a$, and the two sides or heads $b$, $c$, which are dished as shown so that their rims are parallel and almost engage each other, leaving only a narrow space between them of sufficient width to permit passage of the wire from the coil $d$, within the spool. By reason of these dished sides or heads the coil is completely inclosed and the coil is thereby in a measure prevented from unwinding except as desired. However as an additional prevention against the wire flying off when the spool is given a rapid twirl a movable key or stop $e$ is provided in the form of a block or plate fitting the inner surfaces of the spool heads so that it can freely slide thereon as the spool is rotated and having the shank $f$, extending loosely and radially through the opening between the adjacent faces of the rims provided with weight $g$. The block, shank and weight being preferably although not necessarily cast or otherwise formed integral. This weight or gravity lock or stop constantly tends to remain at the lower side of the spool and as the wire is drawn from the coil down through the space between the rims it is of very frequent occurrence, that on account of the quick action of the machine, the spool will run farther or unwind more wire than is necessary. At this particular point the block or stop comes in and does its work of checking the wire from falling out or off the spool. The stop or lock serves the double purpose of locking the wire positively in the spool and being of sufficient weight to continuously hang at the bottom while the spool is traveling around, thereby forming a certain check or tension on the spool and preventing the same twirling or running around farther than necessary. The hub $a$, is preferably hollow and cast or otherwise formed integral with the head $b$. The tube $h$, is concentrically located in and forms the axis or journal box of the hub and projects beyond the open end thereof and is externally threaded. The head $c$, is provided with an opening through which said tube passes loosely and with a flange to fit in the open end of the hub. The head $c$, is removably secured in position by the nut $j$. screwing down on the outer side of the same on the outer threaded end of the tube $h$. Between the hub and the rims the heads are open with spokes at intervals, and the outer face or periphery is provided with longitudinal grooves $k$, ending at the openings between the spokes of the heads. The said flange of head $c$, is provided with a notch $l$, to receive a pin $m$, projecting inwardly in the hub to hold the head $c$, in its proper position against turning. The parts of the spool being separated the coil of wire secured by the wire ties $n$, is slipped on the hub, the gravity stop is placed in position, the head $c$, is placed on the hub and in proper position and the parts are clamped together by the nut $j$. The ties $n$, are then parted (as the coil is entirely inclosed in the spool) and drawn out from the grooves $k$, through the openings in the heads, the coil having been so placed that the ties lie in the grooves $k$.

The many advantages and great utility of this invention are obvious. The coils of wire can be easily and cheaply transported and easily and quickly attached or placed in the spools. Consumers can keep their spools and easily provide coils of wire or keep a good supply on hand.

Various means can be provided for locking the parts of the spool together and many changes and modifications can be made in the forms, constructions and arrangements of the parts described without departing from the spirit and scope of my invention, hence I do not wish to limit myself to what is here shown and described.

Having fully described my invention, what I claim, and desire to secure by Letters Patent of the United States, is—

1. The herein described spool for coiled wire comprising the hub, and the two heads located at the ends of the hub and dished or inclined inwardly from the ends of said hub toward each other, so that their rims are parallel and located close together leaving the continuous narrow peripheral opening between said rims for the passage of a strand of wire, said head being formed so as to inclose the wire coil on the hub and prevent uncoiling thereof and flying off of the spool, as shown and described.

2. The herein described spool for coiled wire comprising the hub, the two heads at the ends of the hub dished toward each other so that their rims are located close together leaving the narrow continuous peripheral opening between said rims so that the heads will completely inclose the coil of wire on the hub, and the gravity stop arranged to slide on the inner surfaces of said rims and extend across the said opening, and movable freely on said rims as the heads rapidly rotate so that the stop will always drop to the lower portion of the heads and prevent the wire springing around through the continuous opening, as set forth.

3. The herein described spool comprising the hub having the inwardly dished heads secured thereto so as to inclose the spool or coil of wire and leave the narrow continuous peripheral opening between the rims of the heads, and having the freely movable sliding gravity stop resting on the inner surfaces of said rims, and extending across the opening and provided with the outwardly extended weighted arm projecting through said opening, as and for the purposes set forth and described.

4. The herein described spool consisting of the cylindrical hub formed integral with the head at one end and having its opposite end open, and having the tube projecting therefrom a distance beyond the same and externally threaded, and an inwardly projecting pin, the opposite removable head having the central opening to fit on said tube, and having the inwardly extending flange to fit in said hub and provided with a notch to engage said pin, and the nut to screw on said tube and clamp said removable head in position, substantially as set forth.

In testimony that I claim the foregoing as my own I affix my signature in presence of two witnesses.

CHARLES BECK.

Witnesses:
THOMAS P. KELLY,
ANDREW SIMON.